United States Patent

[11] 3,624,061

| [72] | Inventor | Donald E. Hostetler<br>Monroeville, Pa. |
|---|---|---|
| [21] | Appl. No. | 587,399 |
| [22] | Filed | Oct. 18, 1966 |
| [45] | Patented | Nov. 30, 1971 |
| [73] | Assignee | Dart Industries Inc.<br>Continuation of application Ser. No.<br>232,588, Oct. 23, 1962, now abandoned.<br>This application Oct. 18, 1966, Ser. No.<br>587,399 |

[54] PROCESS
2 Claims, No Drawings

| [52] | U.S. Cl. | 260/88.2 R |
|---|---|---|
| [51] | Int. Cl. | C08f 15/04 |
| [50] | Field of Search | 260/88.2,<br>88.2 R |

[56] References Cited
UNITED STATES PATENTS

| 3,051,690 | 8/1962 | Vandenberg | 260/88.2;94.9 C |
|---|---|---|---|
| 3,225,021 | 12/1965 | Erchok | 260/93.7 |
| 3,326,883 | 6/1967 | Kelley | 260/94.9 |
| 3,002,961 | 5/1962 | Kirschner | 260/93.7 |
| 3,032,510 | 12/1960 | Tornqvist | 260/94.9 |

FOREIGN PATENTS

| 856,736 | 12/1960 | Great Britain | C08f/15/40 |
|---|---|---|---|

*Primary Examiner*—Joseph L. Schofer
*Assistant Examiner*—Roger S. Benjamin
*Attorneys*—Fred S. Valles and Richard A. Dannells, Jr.

ABSTRACT: Ethylene/propylene random copolymers are formed by reacting a minor amount of ethylene and a major amount of propylene in the reactor in the presence of hydrogen and a diethyl aluminum chloride and a cocrystallized $TiCl_3 \cdot AlCl_3$ catalyst under a pressure of from about 200 to about 500 p.s.i.g. which is sufficient to maintain at least part of the propylene in the liquid phase in the reactor.

PROCESS

This is a continuation of my prior application Ser. No. 232,588, filed Oct. 23, 1962, now abandoned.

The present invention relates to a novel and useful polymerization process. More particularly, it relates to an improved process for the formation of an ethylene/proplyene random copolymer.

It is known in the art that ethylene and proplyene can be copolymerized in a random manner to form elastomeric materials which are commonly referred to as "EPR" or EP rubbers. In preparing such ethylene/propylene random copolymers, it is desirable to obtain as high a productivity (i.e. grams of polymer/gram of catalyst/hour) as is possible so as to minimize the catalyst required and the purification procedure generally necessary for removing the catalyst from the polymer. Obviously, if a process were to be provided in which productivity could be materially increased, it would receive widespread acceptance in the art.

It is an object of the present invention to provide an improved process for forming ethylene/propylene random copolymers. A further object is to provide a relatively simple process for forming such copolymers which requires little, if any, additional equipment. A still further object is to provide a process for producing an ethylene/proplyene random copolymer which gives improved productivity over the processes known in the prior art. Other objects will become apparent as the description of the invention proceeds.

These objects are accomplished by the present invention which provides a process for forming an ethylene/propylene random copolymer which comprises reacting, in the presence of hydrogen, an aluminum alkyl compound and a cocrystallized $TiCl_3 \cdot AlCl_3$ catalyst, a mixture comprising from about 2 to about 20 percent by weight of ethylene and from about 80 percent to about 98 percent by weight of propylene in a reactor under sufficient pressure to maintain at least a part of the propylene in the liquid phase in the reactor.

In a preferred embodiment of the present invention, a mixture consisting essentially of from about 5 to about 15 percent by weight of ethylene and from about 85 percent to about 95 percent by weight of propylene is reacted at a pressure of from about 200 to about 500 p.s.i.g. The temperature is preferably from about 50° to about 200° F. and more preferably from about 100° to about 150° F.

The expression "random copolymer" is used in its conventional chemical sense to mean that both ethylene and propylene are present to take part in the polymerization reaction and the polymer chain is built up with such groups randomly spaced within the chain.

The terms "an aluminum alkyl compound" and a "a cocrystallized $TiCl_3 \cdot AlCl_3$ catalyst" are also used in their conventional sense as known in the art. A complete description of such a catalyst system is disclosed in U.S. Pat. No. 3,032,510, which patent and definitions therein are hereby incorporated by reference.

In carrying out the reaction, it is essential that sufficient pressure be exerted on the system so as to maintain at least a portion of the propylene in the liquid phase. Of course, the pressure required will vary depending upon the critical pressure of the propylene at the particular temperature employed for the reaction. In general, pressures of about 200 to about 500 p.s.i.g. will be employed for the process.

The temperature employed for the reaction is not critical and any temperature in which a part of the propylene will still remain in the liquid phase (at a practical pressure) is suitable. Preferably, the reaction is carried out somewhat above room temperature and a particularly preferred temperature range is from about 100° to about 150° F. so as to obtain high productivity without the use of excessive temperature and/or pressures.

The amount of hydrogen employed in the process is not critical and may be varied as desired. While it is true that varying the amount of hydrogen will alter somewhat the final physical characteristics of the product, the particular amount of hydrogen employed does not materially affect the improved productivity obtained by operating in accordance with the present invention.

The following examples are given to illustrate the invention and are not intended to limit it in any manner. In the examples, all parts are expressed in parts by weight unless otherwise indicated. The $3TiCl_3 \cdot AlCl_3$ (which may also be expressed as $AlCl_3 \cdot bqTiCl_3$) employed in the examples, is a cocrystallized catalyst as described in U.S. Pat. No. 3,032,510.

EXAMPLE 1

To a 1-liter stirred stainless steel pressure reactor is charged, under an argon atmosphere, 0.3 gram of $3TiCl_3 \cdot AlCl_3$ and 4.2 cc. of 1.0 molar diethyl aluminum chloride in cyclohexane. The Al/Ti mole ratio is 2/1. The reactor is closed and pressured to 5 p.s.i.g. with hydrogen. Then 400 ml. of liquid propylene (0.58 g./cc.) is introduced with stirring at 75° F. Then, 10 grams of ethylene is immediately introduced into the reactor. The polymerization temperature is increased within about 5–10 minutes to 140° F. with external heating during which time ethylene is added at a rate of 0.25 gram/minute. The reactor (pressure is about 435 p.s.i.g. which is the pressure) of the propylene and ethylene gas at equilibrium. Liquid propylene is present as a liquid in the reactor. Ethylene is added at 1/gram minute throughout the process. After 30 minutes 50 grams of propylene are pressured into the reactor.

At the end of 1 hour (total elapsed time), 10 cc. of methanol is pressured into the reactor. The reactor is vented to atmospheric pressure and the contents of the reactor (in the form of particles) are transferred to a 2-liter beaker containing 500 cc. methanol/water (50/50 mixture). The slurry is stirred for 1 hour and filtered. The polymer is dried in a vacuum oven (60° C. and 50 mm. Hg) for 12 hours. The polymer weighs 150 grams and contains 40 percent ethylene (weight basis).

The productivity rate in grams of polymer/gram of catalyst/hour is about 500.

CONTROL

Procedure A

The procedure of example 1 is repeated with the exception that a pressure of 135 p.s.i.g. of ethylene and propylene (in the same weight ratio) is employed in the reactor so that liquid propylene is not present. At the end of 1 hour the polymer is separated as in example 1, but only about 40 grams of polymer are obtained.

The productivity rate in grams of polymer/gram of catalyst/hour is only about 124.

The control procedure demonstrates the increased productivity obtained by utilizing the present invention.

Procedure B

The procedure of example 1 is again repeated employing substantially the same reaction temperatures and pressures with the exception that no ethylene is introduced into the system. Liquid propylene is present as a liquid in the reactor and a polypropylene homopolymer is obtained. After separating the polymer, as in example 1, only about 50 grams of polypropylene are obtained.

The productivity rate in grams of polymer/gram of catalyst/hour is only about 167.

The control procedure demonstrates the increased productivity obtained by utilizing the present invention.

EXAMPLE 2

To a 1-liter stirred stainless steel pressure reactor is charged, under an argon atmosphere, 0.42 gram of $3TiCl_3 \cdot AlCl_3$ and 5.6 cc. of 1.0 molar diethyl aluminum chloride in cyclohexane. The Al/Ti mole ratio is 2/1. The reactor is closed and pressured to 10 p.s.i.g. with hydrogen. Then 400 ml. of liquid propylene (0.58 g./cc.) is introduced with stirring at 75° F. Then, 15 grams of ethylene is immediately introduced into the reactor. The polymerization temperature is increased within about 5–10 minutes to 140° F. with external heating during which time ethylene is added at a rate of 1 gram/minute. The reactor pressure is about 438 p.s.i.g. which is the pressure of the propylene and ethylene gas at equilibrium. Liquid propylene is present as a liquid in the reactor. Ethylene is added at 1.5 gram/minute throughout the process. After 30 minutes, 50 grams of propylene are pressured into the reactor.

At the end of 1 hour (total elapsed time), 10 cc. of methanol is pressured into the reactor. The reactor is vented to atmospheric pressure and the contents of the reactor (in the form of particles) are transferred to a 2-liter beaker containing 500 cc. methanol/water (50/50 mixture). The slurry is stirred for 1 hour and filtered. The polymer is dried in a vacuum oven (60° C. and 50 mm. Hg) for 12 hours. The polymer weighs 240 grams and contains 34 percent ethylene (weight basis).

The productivity rate in grams of polymer/gram of catalyst/hour is about 560.

EXAMPLE 3

To a 1-liter stirred stainless steel pressure reactor is charged, under an argon atmosphere, 0.33 gram of $3TiCl_3 \cdot AlCl_3$ and 4.5 cc. of 1.0 molar diethyl aluminum chloride in cyclohexane. The Al/Ti mole ratio is 2/1. The reactor is closed and pressured to 20 p.s.i.g. with hydrogen. Then 200 ml. of liquid (0.58 g./cc.) is introduced with stirring at 75° F. Then, 20 grams of ethylene is immediately introduced into the reactor. The polymerization temperature is increased within about 5–10 minutes to 140° F. with external heating during which time ethylene is added at a rate of 1 gram/minute. The reactor pressure is about 448 p.s.i.g. which is the pressure of the propylene and ethylene gas at equilibrium. Liquid propylene is present as a liquid in the reactor. Ethylene is added at 1.5 grams/minute throughout the process. After 30 minutes, 50 grams of propylene are pressured into the reactor.

At the end of 1 hour (total elapsed time), 10 cc. of methanol is pressured into the reactor. The reactor is vented to atmospheric pressure and the contents of the reactor (in the form of particles) are transferred to a 2-liter beaker containing 50 cc. methanol/water (50/50 mixture). The slurry is stirred for 1 hour and filtered. The polymer is dried in a vacuum oven (60° C. and 50 mm. Hg) for 12 hours. The polymer weighs 190 grams and contains 36 percent ethylene (weight basis).

The productivity rate in grams of polymer/gram of catalyst/hour is about 575.

EXAMPLE 4

To a 1-liter stirred stainless steel pressure reactor is charged, under an argon atmosphere, 0.27 gram of $3TiCl_3 \cdot AlCl_3$ and 3.8 cc. of 1.0 molar diethyl aluminum chloride in cyclohexane. The Al/Ti mole ratio is 2/1. The reactor is closed and pressured to 10 p.s.i.g. with hydrogen. Then 400 ml. of liquid propylene (0.58 g./cc.) is introduced with stirring at 75° F. Then, 20 grams of ethylene is immediately introduced into the reactor. The polymerization temperature is increased within about 5–10 minutes to 140° F. with external heating during which time ethylene is added at a rate of 1 gram/minute. The reactor pressure is about 448 p.s.i.g. which is the pressure of the propylene and ethylene gas at equilibrium. Liquid propylene is present as a liquid in the reactor. Ethylene is added at 1.5 grams/minute throughout the process. After 30 minutes, 50 grams of propylene are pressured into the reactor.

At the end of 1 hour (total elapsed time), 10 cc. of methanol is pressured into the reactor. The reactor is vented to atmospheric pressure and the contents of the reactor (in the form of particles) are transferred to a 2-liter beaker containing 500 cc. methanol/water (50/50 mixture). The slurry is stirred for 1 hour and filtered. The polymer is dried in a vacuum oven (60° C. and 50 mm. Hg) for 12 hours. The polymer weighs 140 grams and contains 48 percent ethylene (weight basis).

The productivity rate in grams of polymer/gram of catalyst/hour is about 520.

EXAMPLE 5

To a 1-liter stirred stainless steel pressure reactor is charged, under an argon atmosphere, 0.43 gram of $3TiCl_3 \cdot AlCl_3$ and 5.5 cc. of 1.0 molar diethyl aluminum chloride in cyclohexane. The Al/Ti mole ratio is 2/1. The reactor is closed and pressured to 20 p.s.i.g. with hydrogen. Then 400 ml. of liquid propylene (0.58 g./cc.) is introduced with stirring at 75° F. Then, 20 grams of ethylene is immediately introduced into the reactor. The polymerization temperature is increased within about 5–10 minutes to 140° F. with external heating during which time ethylene is added at a rate of 1.5 grams/minute. The reactor pressure is about 448 p.s.i.g. which is the pressure of the propylene and ethylene gas at equilibrium. Liquid propylene is present as a liquid in the reactor. Ethylene is added at 2.0 grams/minute throughout the process. After 30 minutes, 50 grams of propylene are pressured into the reactor.

At the end of 1 hour (total elapsed time), 10 cc. of methanol is pressured into the reactor. The reactor is vented to atmospheric pressure and the contents of the reactor (in the form of particles) are transferred to a 2-liter beaker containing 500 cc. methanol/water (50/50 mixture). The slurry is stirred for one hour and filtered. The polymer is dried in a vacuum oven (60° C. and 50 mm. Hg) for 12 hours. The polymer weighs 195 grams and contains 55 percent ethylene (weight basis).

The productivity rate in grams of polymer/gram of catalyst/hour is about 450.

EXAMPLE 6

To a 1-liter stirred stainless steel pressure reactor is charged, under an argon atmosphere, 0.16 gram of $3TiCl_3 \cdot AlCl_3$ and 2.0 cc. of 1.0 molar diethyl aluminum chloride in cyclohexane. The Al/Ti mole ratio is 2/1. The reactor is closed and pressured to 20 p.s.i.g. with hydrogen. Then 400 ml. of liquid propylene (0.58 g./cc.) is introduced with stirring at 75° F. Then, 20 grams of ethylene is immediately introduced into the reactor. The polymerization temperature is increased within about 5–10 minutes to 140° F. with external heating during which time ethylene is added at a rate of 1.0 grams/minute. The reactor pressure is about 448 p.s.i.g. which is the pressure of the propylene and ethylene gas at equilibrium. Liquid propylene is present as a liquid in the reactor. Ethylene is added at 1.0 grams/minute throughout the process. After 30 minutes, 50 grams of propylene are pressured into the reactor.

At the end of 1 hour (total elapsed time), 10 cc. of methanol is pressured into the reactor. The reactor is vented to atmospheric pressure and the contents of the reactor (in the form of particles) are transferred to a 2-liter beaker containing 500 cc. methanol/water (50/50 mixture). The slurry is stirred for 1 hour and filtered. The polymer is dried in a vacuum oven (60° C. and 50 mm. Hg) for 12 hours. The polymer weighs 190 grams and contains 35 percent ethylene (weight basis).

The productivity rate in grams of polymer/gram of catalyst/hour is about 1190.

EXAMPLE 7

To a 1-liter stirred stainless steel pressure reactor is charged, under an argon atmosphere, 0.40 gram of $3TiCl_3 \cdot AlCl_3$ and 5.5 cc. of 1.0 molar diethyl aluminum chloride in cyclohexane. The Al/Ti mole ratio is 2/1. The reactor is closed and pressured to 10 p.s.i.g. with hydrogen. Then 400 ml. of liquid propylene (0.58 g./cc.) is introduced with stirring at 75° F. Then, 10 grams of ethylene is immediately introduced into the reactor. The polymerization temperature is increased within about 5–10 minutes to 140° F. with external heating during which time ethylene is added at a rate of 0.5 gram/minute. The reactor pressure is about 435 p.s.i.g. which is the pressure of the propylene and ethylene gas at equilibrium. Liquid propylene is present as a liquid in the reactor. Ethylene is added at 1.0 grams/minute throughout the process. After 30 minutes, 50 grams of propylene are pressured into the reactor.

At the end of 1 hour (total elapsed time), 10 cc. of methanol is pressured into the reactor. The reactor is vented to atmospheric pressure and the contents of the reactor (in the form of particles) are transferred to a 2-liter beaker containing 500 cc. methanol/water (50/50 mixture). The slurry is stirred for 1 hour and filtered. The polymer is dried in a vacuum oven (60° C. and 50 mm. Hg) for 12 hours. The polymer weighs 200 grams and contains 25 percent ethylene (weight basis).

The productivity rate in grams of polymer/gram of catalyst/hour is about 500.

EXAMPLE 8

To a 1-liter stirred stainless steel pressure reactor is charged, under an argon atmosphere, 0.32 gram of $3TiCl_3 \cdot AlCl_3$ and 4.4 cc. of 1.0 molar diethyl aluminum chloride in cyclohexane. The Al/Ti mole ratio is 2/1. The reactor is closed and pressured to 10 p.s.i.g. with hydrogen. Then 400 ml. of liquid propylene (0.58 g./cc.) is introduced with stirring at 75° F. Then, 20 grams of ethylene is immediately introduced into the reactor. The polymerization temperature is increased within about 5–10 minutes to 140° F. with external heating during which time ethylene is added at a rate of 1.5 grams/minute. The reactor pressure is about 448 p.s.i.g. which is the pressure of the propylene and ethylene gas at equilibrium. Liquid propylene is present as a liquid in the reactor. Ethylene is added at 2.0 grams/minute throughout the process. After 30 minutes, 50 grams of propylene are pressured into the reactor.

At the end of 1 hour (total elapsed time), 10 cc. of methanol is pressured into the reactor. The reactor is vented to atmospheric pressure and the contents of the reactor (in the form of particles) are transferred to a 2-liter beaker containing 500 cc. methanol/water (50/50 mixture). The slurry is stirred for 1 hour and filtered. The polymer is dried in a vacuum oven (60° C. and 50 mm. Hg) for 12 hours. The polymer weighs 150 grams and contains 52 percent ethylene (weight basis).

The productivity rate in grams of polymer/gram of catalyst/hour is about 470.

EXAMPLE 9

To a 1-liter stirred stainless steel pressure reactor is charged, under an argon atmosphere, 0.27 gram of $3TiCl_3 \cdot AlCl_3$ and 3.7 cc. of 1.0 molar diethyl aluminum chloride in cyclohexane. The Al/Ti mole ratio is 2/1. The reactor is closed and pressured to 10 p.s.i.g. with hydrogen. Then 300 ml. of liquid propylene (0.58 g./cc.) is introduced with stirring at 75° F. Then, 15 grams of ethylene is immediately introduced into the reactor. The polymerization temperature is increased within about 5–10 minutes to 140° F. with external heating during which time ethylene is added at a rate of 1.0 grams/minute. The reactor pressure is about 435 p.s.i.g. which is the pressure of the propylene and ethylene gas at equilibrium. Liquid propylene is present as a liquid in the reactor. Ethylene is added at 2.0 grams/minute throughout the process. After 30 minutes, 50 grams of propylene are pressured into the reactor.

At the end of 1 hour (total elapsed time), 10 cc. of methanol is pressured into the reactor. The reactor is vented to atmospheric pressure and the contents of the reactor (in the form of particles) are transferred to a 2-liter beaker containing 500 cc. methanol/water (50/50 mixture). The slurry is stirred for 1 hour and filtered. The polymer is dried in a vacuum oven (60° C. and 50 mm. Hg) for 12 hours. The polymer weighs 160 grams and contains 55 percent ethylene (weight basis).

The productivity rate in grams of polymer/gram of catalyst/hour is about 590.

While in the above examples unmodified ethylene/propylene random copolymers are produced, it is obvious that minor amounts of other materials such as dyes, pigments, fibers, and other comonomers may be introduced without substantial alteration of the physical properties of any shaped structures formed from such products.

The random copolymers formed in accordance with the present invention can be fabricated into useful articles in the same manner as known ethylene/propylene random copolymers. For example, the compositions can be molded or extruded to form toys, tubing, films and the like.

Many equivalent modifications will be apparent to those skilled in the art from a reading of the foregoing without a departure from the inventive concept.

What is claimed is:

1. The process of forming an ethylene/propylene random copolymer which consists of reacting in the presence of hydrogen a diethyl aluminum chloride and a cocrystallized $TiCl_3 3^3$ catalyst, a mixture comprising from about 2 to about 20 percent by weight of ethylene and from about 80 to about 98 percent by weight propylene in a reactor under a pressure of from about 200 to about 500 p.s.i.g. which is sufficient to maintain at least a part of the propylene in the liquid phase in the reactor by initially charging to said reactor at least a portion of said propylene and immediately thereafter charging a portion of said ethylene and heating the mixture to a temperature in the range of 100° to about 150° F.

2. The process of forming an ethylene/propylene random copolymer which consists of reacting in the presence of hydrogen a diethyl aluminum chloride and cocrystallized $TiCl_3 \cdot AlCl3$ catalyst, a mixture comprising from about 5 to about 15 percent by weight of ethylene and from about 85 to about 95 percent by weight propylene in a reactor under a pressure of from about 200 to about 500 p.s.i.g. which is sufficient to maintain at least a part of the propylene in the liquid phase in the reactor by initially charging to said reactor at least a portion of said propylene and immediately thereafter charging a portion of said ethylene and heating the mixture to a temperature in the range of 100° to about 150° F.

* * * * *

UNITED STATES PATENT OFFICE
CERTIFICATE OF CORRECTION

Patent No. 3624061          Dated November 30, 1971

Inventor(s)    Hostetler, Donald E.

It is certified that error appears in the above-identified patent and that said Letters Patent are hereby corrected as shown below:

Column 6, line 40, the formula of Claim 1 should appear as follows:

$$TiCl_3 \cdot AlCl_3$$

Signed and sealed this 2nd day of May 1972.

(SEAL)
Attest:

EDWARD M. FLETCHER, JR.           ROBERT GOTTSCHALK
Attesting Officer                Commissioner of Patents